US006996724B2

(12) United States Patent
Murakami et al.

(10) Patent No.: US 6,996,724 B2
(45) Date of Patent: Feb. 7, 2006

(54) SECRET KEY GENERATING METHOD, COMMON KEY GENERATING METHOD, ENCRYPTION METHOD, CRYPTOGRAPHIC COMMUNICATION METHOD AND CRYPTOGRAPHIC COMMUNICATION SYSTEM

(75) Inventors: Yasuyuki Murakami, Kyoto (JP); Masao Kasahara, 15-3, Aogein 4-chome, Mino-shi, Osaka 562-0025 (JP); Shigeo Tsujii, 4-2-19, Jingumae, Shibuya-ku, Tokyo 150-0001 (JP)

(73) Assignees: Murata Kikai Kabushiki Kaisha, Kyoto (JP); Masao Kasahara, Osaka (JP); Shigeo Tsujii, Tokyo (JP)

( * ) Notice: Subject to any disclaimer, the term of this patent is extended or adjusted under 35 U.S.C. 154(b) by 1107 days.

(21) Appl. No.: 09/767,620

(22) Filed: Jan. 23, 2001

(65) Prior Publication Data

US 2001/0036275 A1 Nov. 1, 2001

(30) Foreign Application Priority Data

Jan. 25, 2000 (JP) .............................. 2000-016354

(51) Int. Cl.
*H04L 9/00* (2006.01)

(52) U.S. Cl. .................. 713/193; 713/193; 380/28; 380/37; 380/44; 380/260; 380/277; 380/286

(58) Field of Classification Search ............ 380/21–25, 380/28, 30, 44–47, 243, 257, 259, 265, 277, 380/279, 283; 713/193
See application file for complete search history.

(56) References Cited

U.S. PATENT DOCUMENTS

| | | | | |
|---|---|---|---|---|
| 4,218,582 A | * | 8/1980 | Hellman et al. | 380/30 |
| 4,399,323 A | * | 8/1983 | Henry | 380/30 |
| 5,016,276 A | | 5/1991 | Matumoto et al. | 380/45 |
| 5,220,606 A | * | 6/1993 | Greenberg | 380/43 |
| 5,966,449 A | * | 10/1999 | Iwamura et al. | 380/44 |
| 5,987,129 A | * | 11/1999 | Baba | 380/279 |
| 6,289,454 B1 | * | 9/2001 | Eslinger et al. | 713/189 |
| 6,298,137 B1 | * | 10/2001 | Hoffstein et al. | 380/30 |

FOREIGN PATENT DOCUMENTS

JP 2000-332744 11/2000

OTHER PUBLICATIONS

Rolf Blom, "Non-Public Key Distribution", Linköping University, New York: Plenum Press, pp. 231-236.
Adi Shamir, "Identity-Based Cryptosystems and Signature Schemes", Weizmann Institute of Science, Springer-Verlag, pp. 47-53.
"A New Concept of Key Sharing Systems", by Shigeo Tsujii, Yasuyuki Murakami and Masao Kasahara The 1999 Symposium on Cryptography and Information Security—Jan. 26, 1999, vol. 1, pp. 135-140.

(Continued)

*Primary Examiner*—Emmanuel L. Moise
*Assistant Examiner*—Taghi T. Arani
(74) *Attorney, Agent, or Firm*—Hogan & Hartson, LLP

(57) ABSTRACT

At the time when generating a secret key of each entity by using each divided identification information (ID division vector) obtained by dividing identification information (ID vector) of each entity into a plurality of blocks and by using a secret symmetric matrix of each key generating agency (center), a part of the components of the symmetric matrix is extracted in accordance with each divided identification information (ID division vector) so that the extracted components are synthesized with a random number particular to each entity so as to generate a secret key of each entity.

18 Claims, 5 Drawing Sheets

OTHER PUBLICATIONS

"Common Key Sharing Scheme Based on Double Exponent Function", by Masao Kasahara, Yasuyuki Murakami and Shigeo Tsujii Research Conference Report of the Institute of Electronics, Information and Communication Engineers (I Sec 99-2) Published by The Institute of Electronics, Information and Communication Engineers—May 20, 2000, vol. 99, No. 57, pp. 9-13.

* cited by examiner

SECRET KEY GENERATING METHOD, COMMON KEY GENERATING METHOD, ENCRYPTION METHOD, CRYPTOGRAPHIC COMMUNICATION METHOD AND CRYPTOGRAPHIC COMMUNICATION SYSTEM

BACKGROUND OF THE INVENTION

The present invention relates to a secret key generating method for generating a secret key of an entity, to a common key generating method for generating a common key between entities, to an encryption method for encrypting information so that the contents of the information cannot be seen by a party other than the interested parties, to a cryptographic communication method and cryptographic communication system for carrying out information communication between entities through a ciphertext and to a memory product/data signal embodied in carrier wave for recording/transmitting an operation program for the above secret key generating method.

In the modern society, called a highly information-oriented society, based on a computer network, important business documents and image information are transmitted and communicated in a form of electronic information. Such electronic information can be easily copied, so that it tends to be difficult to discriminate its copy and original from each other, thus bringing about an important issue of data integrity. In particular, it is indispensable for establishment of a highly information oriented society to implement such a computer network that meets the factors of "sharing of computer resources," "multi-accessing," and "globalization," which however includes various factors contradicting the problem of data integrity among the parties concerned. In an attempt to eliminate those contradictions, encrypting technologies which have been mainly used in the past military and diplomatic fields in the human history are attracting world attention as an effective method for that purpose.

A cipher communication is defined as exchanging information in such a manner that no one other than the participants can understand the meaning of the information. In cipher communication, encryption is defined as converting an original text (plaintext) that can be understood by anyone into a text (ciphertext) that cannot be understood by the third party and decryption is defined as restoring a ciphertext into a plaintext, and cryptosystem is defined as the overall processes covering both encryption and decryption. The encryption and decryption processes use secret information called an encryption key and a decryption key, respectively. Since the secret decryption key is necessary in decryption, only those knowing this decryption key can decrypt ciphertexts, thus maintaining data security.

The encryption key and the decryption key may be either the same or different from each other. A cryptosystem using the same key is called a common-key cryptosystem, and DES (Data Encryption Standards) employed by the Standard Agency of the USA Commerce Ministry is a typical example. As an example of the cryptosystem using the keys different from each other, a cryptosystem called a public-key cryptosystem has been proposed. In the public-key cryptosystem, each user (entity) utilizing this cryptosystem generates a pair of encryption and decryption keys and publicizes the encryption key in a public key list, thereby keeping only the decryption key in secret. In this public-key cryptosystem, the paired encryption and decryption keys are different from each other, so that the public-key cryptosystem has a feature that the decryption key cannot be known from the encryption key with a one-way function.

The public-key cryptosystem is a breakthrough in cryptosystem which publicizes the encryption key and meets the above-mentioned three factors required for establishing highly information-oriented society, so that it has been studied actively for its application in the field of information communication technologies, thus leading RSA cryptosystem being proposed as a typical public-key cryptosystem. This RSA cryptosystem has been implemented by utilizing the difficulty of factorization into prime factors as the one-way function. Also, a variety of other public-key cryptosystems have been proposed that utilize the difficulty of solving discrete logarithm problems.

Besides, a cryptosystem has been proposed that utilizes ID (identification) information identifying individuals, such as post address and name of each entity. This cryptosystem generates an encryption/decryption key common to a sender and a recipient based on ID information. Besides, the following ID-information based cryptosystems are provided: (1) a technique which needs a preliminary communication between the sender and the recipient prior to a ciphertext communication and (2) a technique which does not need a preliminary communication between the sender and the recipient prior to a ciphertext communication. The technique (2), in particular, does not need a preliminary communication, so that its entities are very convenient in use, thus considered as a nucleus for the future cryptosystems.

A cryptosystem according to this technique (2) is called ID-NIKS (ID-based non-interactive key sharing scheme), whereby sharing an encryption key without a preliminary communication is enabled by employing ID information of a communication partner. The ID-NIKS needs not exchange a public key or a secret key between a sender and a recipient nor receive a key list or services from third parties, thus securing safe communications between any given entities.

FIG. 1 shows principles for this ID-NIKS system. This system assumes the presence of a reliable center as a key generating agency, around which a common-key generation system is configured. In FIG. 1, the information specific to an entity A, i.e. its ID information of a name, a post address, a telephone number, etc. is represented by $h(ID_A)$ using a hash function $h(\bullet)$. For an any given entity A, the center calculates secret information $S_{Ai}$ as follows on the basis of center public information $\{PC_i\}$, center secret information $\{SC_i\}$ and ID information $h(ID_A)$ of the entity A, and sends it to the entity A secretly:

$$S_{Ai} = F_i(\{SC_i\}, \{PC_i\}, h(ID_A))$$

The entity A generates, for communications between itself and another arbitrary entity B, a common key $K_{AB}$ for encryption and decryption with its own secret $\{S_{Ai}\}$, center public information $\{PC_i\}$ and entity B's ID information $h(ID_B)$ of the partner entity B as follows:

$$K_{AB} = f(\{S_{Ai}\}, \{PC_i\}, h(ID_B))$$

The entity B also generates a common key $K_{BA}$ for the entity A similarly. If a relationship of $K_{AB}=K_{BA}$ holds true always, these keys $K_{AB}$ and $K_{BA}$ can be used as the encryption and decryption keys between the entities A and B.

In the above-mentioned public-key cryptosystem, for example, an RSA cryptosystem, its public key measures 10-fold and more as long as the presently used telephone number, thus being very troublesome. To guard against this, in-the ID-NIKS, each ID information can be registered in a form of name list to thereby be referenced in generating a common key used between any given entities. Therefore, by safely implementing such an ID-NIKS system as shown in FIG. 1, a convenient cryptosystem can be installed over a computer network to which a lot of entities are subscribed. For these reasons, the ID-NIKS is expected to constitute a core of the future cryptosystem.

This ID-NIKS has the two following problems. One is the point that the center becomes a Big Brother (grasps the secret of all entities so as to become a key escrow system). The other one is the point that there is a possibility of enabling operation of the secret of the center in the case that a certain number of entities collude. As for this collusion problem, though a great number of devices are carried out to avoid this in a calculation amount manner, it is difficult to solve the problem completely.

The difficulty of this collusion problem is due to the fact that a secret parameter based on identification information (ID information) becomes a double structure of a center secret and a individual secret. In ID-NIKS it is necessary to form a cryptosystem of a parameter publicized by the center, identification information (ID information) publicized individually and secret parameters for these two types and, in addition, not to expose the center secret even in the case that an entity shows an individual secret delivered to itself to another. Therefore, the realization of the construction of this cryptosystem has many problems to be solved.

Then the present inventors divide identification information (ID information) into several pieces, propose to deliver all of the secret keys based on the divided identification information (ID information) from, respectively, a plurality of centers to entities so that the mathematical structure can be limited to the minimum, which makes the avoidance of the collusion problem possible and propose an encryption method (hereinafter this is referred to as a prior example) by ID-NIKS, of which the construction of that cryptosystem is easy.

The reason why a variety of cryptosystems based on identification information (ID information) of entities proposed for the purpose of solving the collusion problem end up unsuccessful is because the device for preventing the center secret from being found from the collusion information of the entities is attempted to much to be achieved in a mathematical structure. In the case that the mathematical structure becomes too complicated, the method for proving the security also becomes difficult. Therefore, according to the method proposed in the prior example, identification information (ID information) of entities are divided into several pieces and all of the secret keys for each divided identification information (ID information) are delivered to the entities and, thereby, the mathematical structure can be limited to the minimum.

In the prior example a plurality of reliable centers are provided so that each center, respectively, generates a secret key which doesn't have a mathematical structure corresponding to each divided identification information (ID information) of each entity so as to be sent to each entity. Each entity generates a common key, without carrying out a preliminary communication, among these secret keys sent from the centers and identification information (ID information) of which the communication partner are made public. The components corresponding to the communication partner which are included in each of those secret keys are, respectively, extracted so as to generate a common key by synthesizing and adding the extracted components. Therefore, each center does not become a Big Brother because one center does not grasp the secret of all of the entities.

In the following the summary of this prior example is described. An ID vector which is identification information showing name, address, or the like, of each entity is assumed to be an L dimensional binary vector and the ID vector is divided into J blocks for each block size M. For example, the ID vector of the entity A(vector $I_A$) is divided as in the following (1). Each vector $I_{Aj}$( 1, 2, . . . , J), which is the divided identification information, is called an ID division vector. Here, a public ID vector of each entity is converted into L(=MJ) bits by the hash function. In addition, J centers are provided in accordance with the number of divisions of the ID vector so that center numbers are denoted as j=1, 2, . . . , J.

$$\vec{I_X} = [\vec{I_{X1}}|\vec{I_{X2}}| \cdots |\vec{I_{XJ}}] \qquad (1)$$

The j-th center forms a symmetric matrix $H_j(2^M \times 2^M)$ of which elements are random numbers. Here, the size of the common key is assumed to be S so as to achieve the following (2) to (4).

$$H_j = (k_{ab}^{(j)}) \qquad (2)$$

$$k_{ab}^{(j)} \in Z_{2^S} \qquad (3)$$

$$a, b \in Z_{2^M} \qquad (4)$$

In addition, the j-th center secretly delivers to each entity a row vector corresponding to its ID division vector from the symmetric matrix $H_j$. That is to say, the vector $S_{Aj} = H_j$[vector $I_{Aj}$] is delivered to the entity A. This $H_j$[vector $I_{Aj}$] represents a vector obtained by extracting one row which corresponds to the vector $I_{Aj}$ from the symmetric matrix $H_j$. The parameter delivered to each entity is called a secret vector.

A common key is assumed to be shared between the entities A and B. The entity A extracts the components corresponding to the entity B from each secret vector received from each center and synthesizes these J components so that, thereby, a common key for the entity B is generated. The entity B also generates a common key for the entity A in the same way. According to the symmetry of the secret matrix $H_j$ generated by each center, the entities A and B can share the same common key. The common key generated in this way is used to carry out the encryption process and the decryption process between the entities A and B.

The present inventors have studied the improvement of such a prior example and have attempted to construct a cryptographic communication system to which the prior example is applied. This prior example has the excellent advantage that the common key can be shared at a very high speed. However, though it cannot be taken into consideration that the entire ID vectors agree for each entity, it can be taken into account that an ID division vector that is a part of them becomes identical. Therefore, there is the defect of being weak against a collusion attack where a plurality of entities collude and offer their own secret partial key so as to pretend to be another entity of which the entire ID vector is formed by a synthesis of ID division vectors of the respective entities and, therefore, further improvement is desired. Such a defect is due to the fact that a part of the secret symmetric matrix of each center is delivered to an entity as it is.

BRIEF SUMMARY OF THE INVENTION

An object of the present invention is to provide a secret key generating method, a common key generating method, an encryption method, a cryptographic communication method and a cryptographic communication system in ID-NIKS which can increase the security compared to the prior example while maintaining the high speed of key sharing in the same way as the prior example, and a memory produce/data signal embodied in carrier wave for recording/transmitting an operation program for this secret key generating method.

According to a secret key generating method of the first aspect of the present invention, in each of the plurality of key generating agencies (centers), each divided identification information (ID division vector) obtained by dividing identification information (ID vector) of the entity into a plurality of blocks and a secret symmetric matrix of each key generating agency (center) are used to extract components which are a part of the symmetric matrix in accordance with each divided identification information and by synthesizing the extracted components with a random number particular to the entity the secret key of the entity is generated. Therefore, since an individual random number is added the secret of the key generating agency (center) cannot be exposed so as to increase the security.

According to a secret key generating method of the second aspect of the present invention, the above described random number which is to be synthesized in a first key generating agency (center) is generated based on the hash function generated by the first key generating agency (center) itself and the hash function generated by a second key generating agency (center). Accordingly, all of the key generating agencies (centers) becomes equal so that a specific key generating agency (center) can be prevented from becoming a Big Brother.

According to a secret key generating method of the third aspect of the present invention, in each of the plurality of key generating agencies (centers) each divided identification information (ID division vector) obtained by dividing identification information (ID vector) of the entity into a plurality of blocks and a secret symmetric matrix of each key generating agency (center) are used to extract components which are a part of the symmetric matrix in accordance with each divided identification information and, thereby, a mask pattern particular to each key generating agency (center) is generated in accordance with each divided identification information and the extracted components are masked by the mask pattern so as to generate a secret key of the entity. Accordingly, even in the case that the divided identification information (ID division vector) is the same in both entities the mask patterns are different so as to be strong against the collusion attack.

In the case that the secret key of each entity is generated through a method by means of the combined characteristics of the first aspect and the third aspect, the random number substitution attack will not succeed.

In addition, in the present invention, components from respective key generating agencies (centers) are synthesized through XOR at the time of generating a common key so as to solve the problem of carry up.

The above and further objects and features of the invention will more fully be apparent from the following detailed description with accompanying drawings.

DETAILED DESCRIPTION OF THE INVENTION

In the following the present invention is described in detail and in reference to the drawings showing the embodiments thereof.

Figure 1:
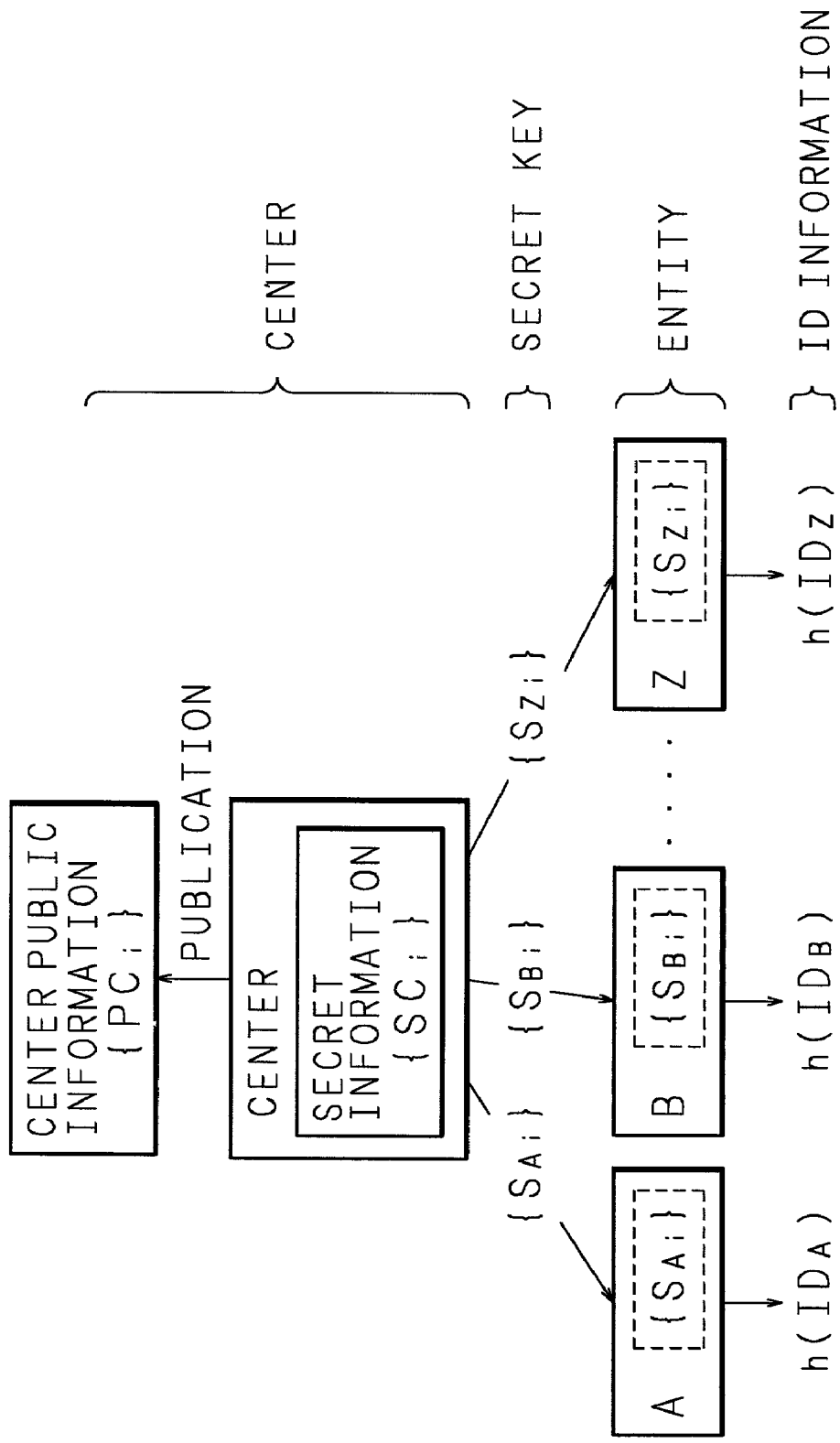
FIG. 1 is a principle configuration view of a system of ID-NIKS.
Figure 2:
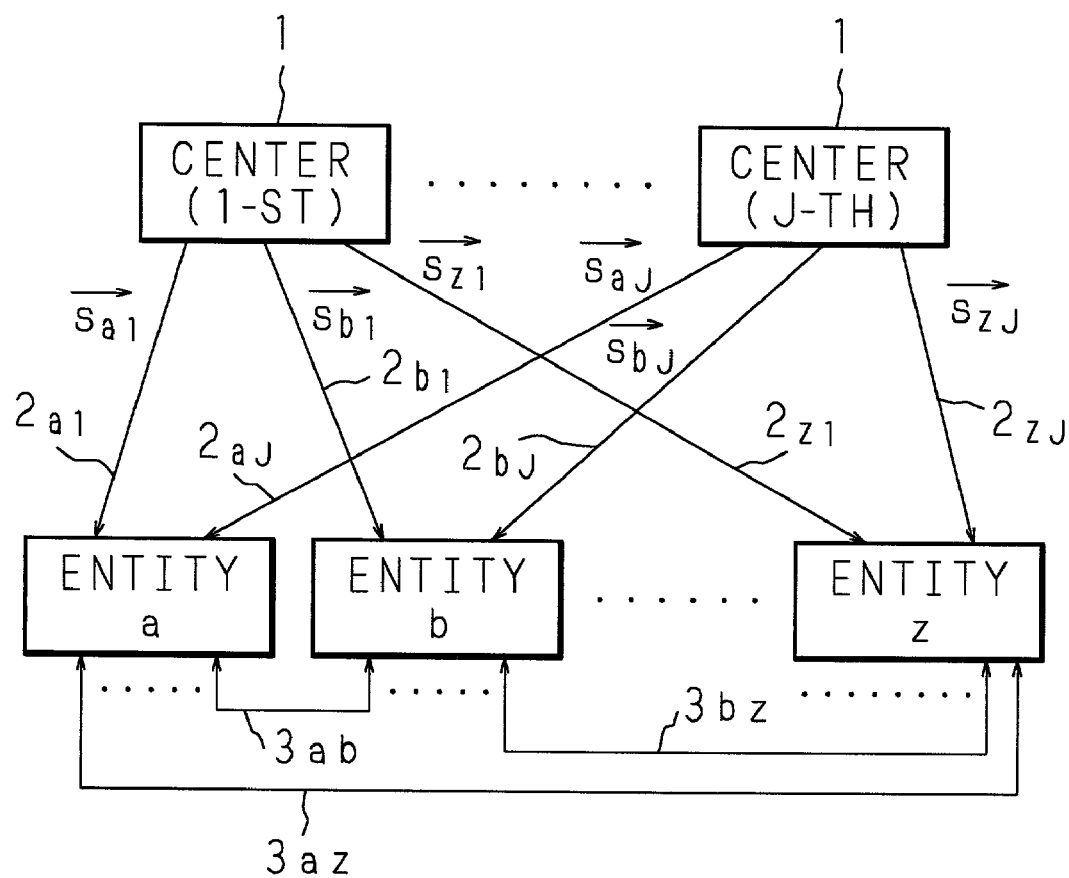
FIG. 2 is a schematic diagram showing a configuration of a cryptographic system according to the present invention.

FIG. 2 is a schematic diagram showing a configuration of a cryptographic communication system according to the present invention. Centers 1, as a plurality of (J) key generating agencies on which the secrecy of information can be relied, are provided and as these centers 1, for example, public organizations in a society can be applicable.

Each of these centers 1 and each of a plurality of entities a, b, . . . , z as users who employ this cryptographic communication system is connected through a communication path $2_{a1}, \ldots, 2_{aJ}, 2_{b1}, \ldots, 2_{bJ}, \ldots 2_{z1}, \ldots, 2_{zJ}$, and a secret key (secret vector) of each entity is sent from each center 1 to each entity a, b, . . . , z through these communication paths. In addition, communication channels $3ab$, $3az$, $3bz$, . . . are provided between the two entities so that a ciphertext obtained by encrypting communication information is mutually transmitted between entities through these communication channels $3ab$, $3az$, $3bz$, . . . .

Figure 3:
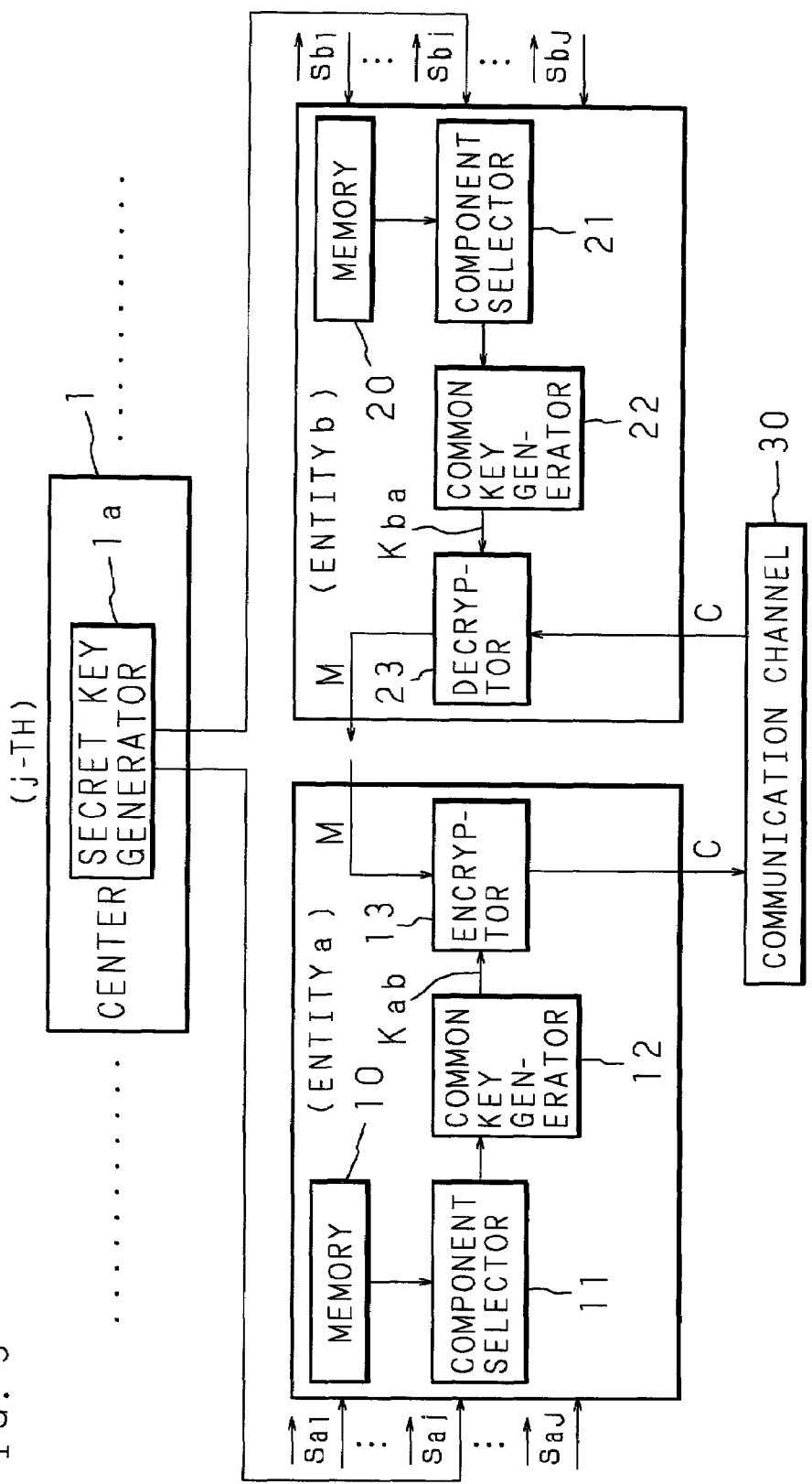
FIG. 3 is a schematic diagram showing a communication status of information between two entities.

FIG. 3 is a schematic diagram showing the communication condition of information between two entities a and b. The example of FIG. 3 shows the case where the entity a encrypts a plaintext (message) M into a ciphertext C, which is transmitted to the entity b so that the entity b decrypts the ciphertext C into the original plaintext (message) M.

A secret key generator 1a which generates a secret key of each entity a, b by using a divided identification information (ID division vector) of each entity a, b is provided in the j-th (j=1, 2, . . . , J) center 1. Then, when a registration is required from each entity a, b, the secret key (secret vector) of each entity a, b is sent to each entity a, b.

A memory 10 which stores secret keys sent from respective J centers 1 in a table format, a component selector 11 which selects components corresponding to the entity b from these secret keys, a common key generator 12 for generating a common key $K_{ab}$ for the entity b which is required by the entity a by synthesizing these selected components and an encryptor 13 which encrypts the plaintext (message) M into the ciphertext C by using the common key $K_{ab}$ and outputs it to the communication channel 30 are provided on the entity a side.

In addition, a memory 20 which stores secret keys sent from respective centers 1 in a table format, a component selector 21 which selects components corresponding to the entity a from these secret keys, a common key generator 22 for generating a common key $K_{ba}$ for the entity a which is required by the entity b by synthesizing these selected components and an decryptor 23 which decrypts the ciphertext C which has been inputted from the communication channel 30 into the plaintext (message) M by using the common key $K_{ba}$ and outputs it are provided on the entity b side.

Next, a process operation of the cryptographic communication in the cryptographic communication system of such a configuration is described.

Preparatory Processing

Figure 4:
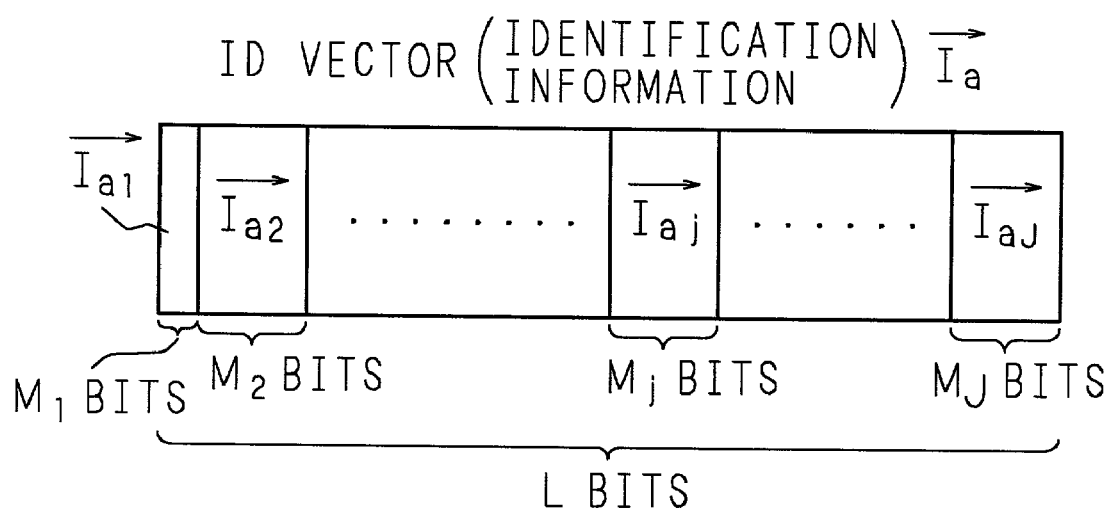
FIG. 4 is a schematic diagram showing a division example of an ID vector of an entity.

An ID vector which is identification information showing name, address, or the like, of each entity is assumed to be an L dimensional binary vector and this ID vector is divided into J blocks for each block size $M_1, M_2, \ldots, M_J$ as shown in FIG. 4. For example, the ID vector (vector $I_a$) of the entity a is divided into a plurality of ID division vectors $I_{aj}$ (j=1, 2, ..., J) as shown in the following (5). Here, when $M_j=M$, the sizes of all of the ID division vectors become equal. It also is possible to set $M_j=1$. In addition, the public ID vector of each entity is converted into L bits by the hash function. Here, in order to simplify the description in the following it is stipulated that $M_j=M$ (constant).

$$\vec{I_a} = [\vec{I_{a1}}|\vec{I_{a2}}| \cdots |\vec{I_{aJ}}]  \quad (5)$$

In the following three types of examples according to the present invention are concretely described.

(First Embodiment)

[Generation and Distribution Processing of Secret Key]

The j-th center 1 generates a symmetric matrix $H_j(2^M \times 2^M)$ which has random numbers as its elements. Here, the size of the common key is assumed to be S so as to satisfy the conditions of the above (2) to (4).

In addition, the j-th center 1 generates a hash function $f_j(\bullet)$ which outputs S bits so as to be secretly sent to the next (j+1)-th center 1. Here, the J-th center 1 sends to the first center 1.

Then, the j-th center 1 extracts a row vector, which corresponds to the ID division vector of the entity a, from the symmetric matrix $H_j$ and carries out XOR on all of the components of the extracted row vector with an individual random number $\alpha_a^{(j)}$ so as to be generated as a secret key vector $s_{aj}$, which is secretly distributed to the entity a.

That is to say, the following (6) is distributed as a secret key vector $s_{aj}$ with respect to m=0, 1, 2, ..., $2^M-1$. Here, $\alpha_a^{(j)}$ is set as in the following (7). In the case of j−1=0, it is treated as J. Here, $k_{aj,m}^{(j)}$ represents each component of the row vector which corresponds to the ID division vector of the entity a.

$$s_{a_j,m} = k_{a_j,m}^{(j)} \oplus \alpha_a^{(j)} \quad (6)$$

$$\alpha_a^{(j)} = f_j(ID_a) \oplus f_{j-1}(ID_a) \quad (7)$$

[Generation of Common Key (Key Sharing)]

The entity a extracts components, which correspond to the entity b, from the secret vectors received from respective J centers and those J components are synthesized through XOR so as to generate a common key $K_{ab}$ for the entity b. At this time, in the case that XOR is carried out on all of the individual random numbers $\alpha_a^{(j)}$ with respect to the entity a, XOR is carried out twice, respectively, for the same hash values so as to obtain 0 and, therefore, the following (8) is achieved.

$$K_{ab} = \bigoplus_{j=1}^{J} s_{a_j b_j} \quad (8)$$

$$= \bigoplus_{j=1}^{J} (k_{a_j b_j}^{(j)} \oplus \alpha_a^{(j)})$$

$$= \bigoplus_{j=1}^{J} k_{a_j b_j}^{(j)}$$

The entity b generates a common key $K_{ba}$ for the entity a in the same way. Here, both common keys $K_{ab}$ and $K_{ba}$ agree based on the symmetry of secret information (matrix $H_j$) which is owned by each of J centers 1.

In this First Embodiment, since the secret of the centers is not exposed, the security level is high. In addition, the existence of a specific center which sets an individual random number for each entity is unnecessary so as to completely eliminate the Big Brother problem.

(Second Embodiment)

[Generation and Distribution Processing of Secret Key]

The j-th center 1 generates a symmetric matrix $H_j$ in the same way as in the First Embodiment. Here, a function $g_j(\bullet)$ which outputs S bits is generated and made public.

Then the j-th center 1 extracts a row vector, which corresponds to the ID division vector of the entity a, from the symmetric matrix $H_j$ so that all of the components of the extracted row vector are masked according to a bit pattern of $g_j(ID_a)$ so as to be generated as a secret key vector $s_{aj}$, which is secretly distributed to the entity a. Here, the mask processing is an AND operation for each bit.

[Generation of Common Key (Key Sharing)]

The entity a extracts components, which correspond to the entity b, from the secret vectors received from respective J centers, and with respect to these components $g_j(ID_b)$ is masked for each component of its own secret keys, of which the values are synthesized through XOR from j=1 to j=J so as to generate a common key $K_{ab}$ for the entity b. That is to say, the following (9) is achieved.

$$K_{ab} = \bigoplus_{j=1}^{J} (s_{a_j b_j} \cap g_j(ID_b)) \quad (9)$$

$$= \bigoplus_{j=1}^{J} (k_{a_j b_j}^{(j)} \cap g_j(ID_a) \cap g_j(ID_b))$$

The entity b also generates a common key $K_{ba}$ for the entity a in the same way. Here, both of the common keys $K_{ab}$ and $K_{ba}$ agree based on the symmetry of secret information (matrix $H_j$) owned by each of J centers 1.

In this Second Embodiment, only a part of the information in the secret information (matrix $H_j$) which has been generated by each center is included in the delivered secret key. For example, even in the case that the ID vectors of the entities a and b are partially equal, the secret key vectors $S_{aj}$ and $S_{bj}$ are not the same since the masks $g_j(ID_a)$ and $g_j(ID_b)$ are different. Accordingly, collusion by a great number of entities is necessary in order to gain the entire information of the secret matrix of each center and, therefore, the collusion threshold value can be set higher.

(Third Embodiment)

The Third Embodiment which is achieved by combining the above described First Embodiment and Second Embodiment is described. This Third Embodiment has the characteristic that a random number substitution attack will not succeed.

[Generation and Distribution Processing of Secret Key]

The j-th center 1 generates a symmetric matrix $H_j$ in the same way as in the First Embodiment. In addition, the j-th center 1 generates a hash function $f_j(\bullet)$ which outputs S bits so as to be secretly sent to the next (j+1)-th center 1. Here, the J-th center 1 sends to the first center 1. In addition, a function $g_j(\bullet)$ which outputs S bits is generated and made public.

Then, the j-th center 1 extracts a row vector, which corresponds to the ID division vector of the entity a, from the symmetric matrix $H_j$ so that all of the components of the extracted row vector are masked according to a bit pattern of $g_j(ID_a)$ and, in addition, XOR is carried out on an individual random number $\alpha_a^{(j)}$ so as to be generated as a secret key vector $S_{aj}$, which is secretly distributed to the entity a. Here, the mask processing is an AND operation for each bit.

That is to say, the following (10) is distributed as a secret key vector $S_{aj}$ with respect to m=0, 1, 2, . . . , $2^M$–1. Here, $\alpha_a^{(j)}$ and $\beta_a^{(j)}$ are set as the following (11) and (12). In the case of j–1=0 it is treated as J.

$$s_{a_j,m} = (k_{a_j,m}^{(j)} \cap \beta_a^{(j)}) \oplus \alpha_a^{(j)} \tag{10}$$

$$\alpha_a^{(j)} = f_j(ID_a) \oplus f_{j-1}(ID_a) \tag{11}$$

$$\beta_a^{(j)} = g_j(ID_a) \tag{12}$$

[Generation of Common Key (Key Sharing)]

The entity a extracts components, which correspond to the entity b, from the secret vectors received from respective J centers and synthesizes these J components through XOR in the same way as in the First Embodiment so as to generate an intermediate key $K_{ab}'$ as the following (13). At this time, XOR is carried out twice, respectively, for the same hash values with respect to the entity a so as to obtain 0, in the same way as in the First Embodiment.

$$K_{ab}' = \bigoplus_{j=1}^{J} s_{a_j b_j} \tag{13}$$

Next, effective bit components are extracted from the intermediate key $K_{ab}'$ while taking the mutual mask value into consideration so as to generate a common key $K_{ab}$ for the entity b as the following (14). Here, bar x represents a NOT operation for each bit of x.

$$K_{ab} = K_{ab}' \cap \bigcap_{j=1}^{J} \overline{\beta_a^{(j)} \oplus \beta_b^{(j)}} \tag{14}$$

The entity b also generates a common key $K_{ba}$ for the entity a in the same way. Here, both of the common keys $K_{ab}$ and $K_{ba}$ agree based on the symmetry of secret information (matrix $H_j$) owned by each of J centers 1.

The safety in this Third Embodiment is described. Since XOR is carried out on each block with an individual random number in the Third Embodiment, partial information of a secret matrix of each center will not be leaked for each block as in the Second Embodiment. In addition, even in the case that a random number substitution attack is applied in order to attack a particular entity, this attack will not succeed because of the effect of the mask processing.

A method of mask processing is used in order to increase the collusive threshold value in the Third Embodiment in the same way as in the Second Embodiment. Accordingly, though the security level increases it should be taken into consideration that the number of effective bits which are available for final key sharing may suddenly decrease in the case that J is made larger. Then, in order to solve this problem, the measures of the next (a) and (b) are possible.

(a) A function $g(\bullet)$ which is common to the entire cryptographic communication system is set so that the function for finding the mask value which is set by each center is obtained as $g_j(\bullet)=g(\bullet)$.

(b) A function $g(\bullet)$ which is common to the entire cryptographic communication system is set so that $g_j(\bullet)=g(\bullet)$ is achieved for J/2 centers of the former half while $g_j(\bullet)=\overline{g(\bullet)}$ is achieved for J/2 centers of the latter half.

In the measures (a), though the masked part is not reduced the part masked by 0 becomes 0 at the time of key sharing and, therefore, an effective part utilized for key sharing becomes approximately ¼ of the entirety in the case that the function $g(\bullet)$ is assumed to output 0 and 1 uniformly.

In the measures (b), since the following (15) is achieved the masked part of the above (14) is not reduced. However, the part which becomes 0 at the time of key sharing because it is masked by 0 in the former half centers becomes effective at the time of key sharing since it is masked by 1 in the latter half centers. Therefore, an effective part utilized for key sharing becomes approximately ½ of the entirety in the case that the function $g(\bullet)$ is assumed to output 0 and 1 uniformly.

$$g(ID_a) \oplus g(ID_b) = \overline{g(ID_a)} \oplus \overline{g(ID_b)} \tag{15}$$

Figure 5:
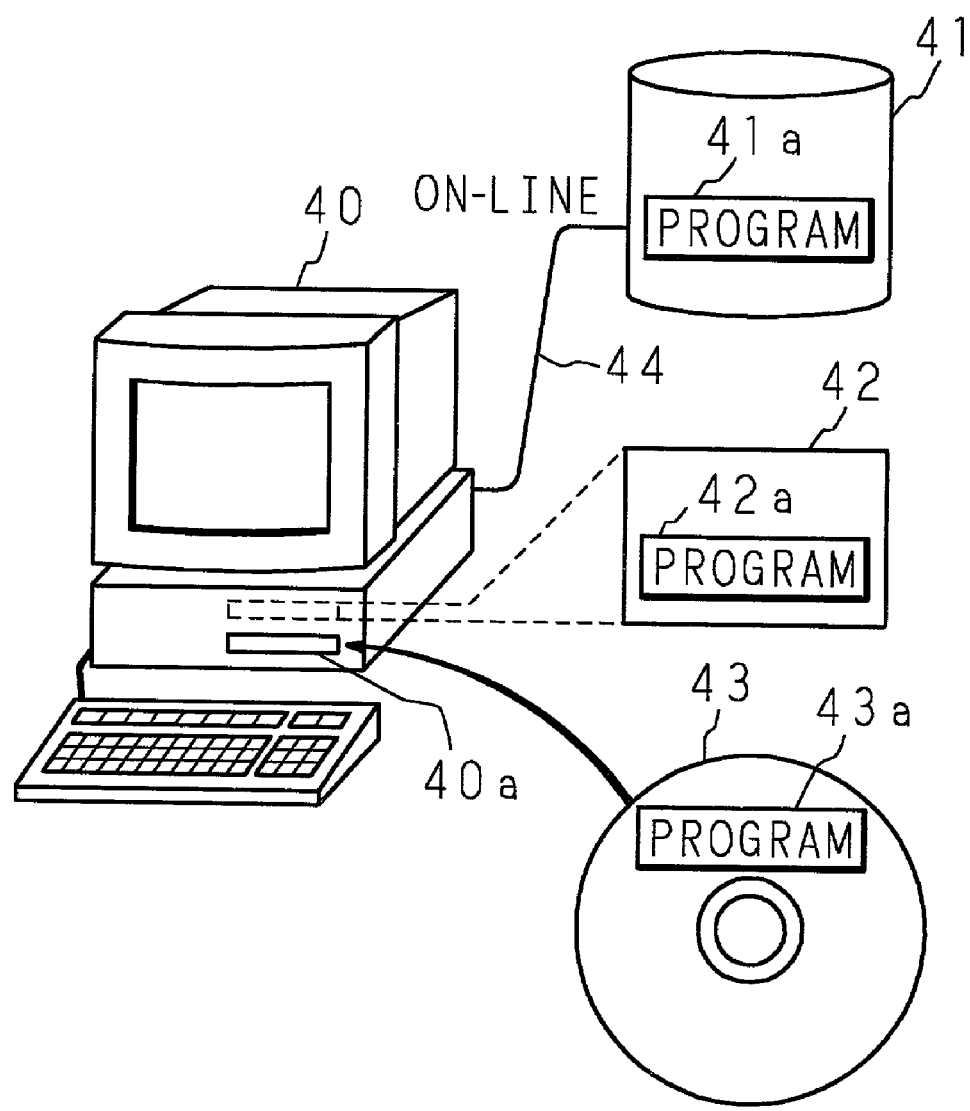
FIG. 5 is a view showing a configuration of an embodiment of memory product.

FIG. 5 is a view showing a configuration of an embodiment of a memory product according to the present invention. The program illustrated here includes the generation processing of a secret key of each entity according to the above described First Embodiment, the generation processing of a secret key of each entity according to the Second Embodiment or the generation processing of a secret key of each entity in the Third Embodiment and is recorded in a memory product described in the following. Here, the computer 40 is provided in each center.

In FIG. 5 the memory product 41 which is connected on line with the computer 40 becomes available by using a server computer of, for example, WWW (World Wide Web) which is installed apart from the installment location of the computer 40 and the program 41a as described above is recorded in the memory product 41. The program 41a which has been read out via a transmission medium 44, such as a communication line from the memory product 41, controls the computer 40 in each center to generate a secret key of each entity.

The memory product 42 provided inside of the computer 40 is formed by using a hard disk drive, a ROM, or the like, which are installed in a built in manner and the program 42*a* as described above is recorded in the memory product 42. The program 42*a*, which has been read out from the memory product 42, controls the computer 40 in each center to generate a secret key of each entity.

A memory product 43, which is utilized by being mounted in a disk drive 40*a* provided in the computer 40, is formed by using an optical magnetic disk, a CD-ROM, a flexible disk, or the like, which are portable and the program 43*a* as described above is recorded in the memory product 43. The program 43*a* which has been read out from the memory product 43 controls the computer 40 in each center to generate a secret key of each entity.

In the present invention, since a part of the components of a symmetric matrix is extracted according to each divided identification information of each entity so that the extracted components are synthesized with a random number particular to each entity so as to generate a secret key of each entity, a secret of the center will not be exposed through the addition of an individual random number so that the security level can be increased.

In addition, since a random number which is supposed to be synthesized with those extracted components is generated by using a hash function which is generated by itself and a hash function which is generated by another center, all of the centers become equal so that a specific center can be prevented from becoming a Big Brother.

In addition, since a part of the components of a symmetric matrix is extracted according to each divided identification information of each entity so that a mask pattern particular to each center is generated based on the divided identification information and the extracted components are masked through that mask pattern so as to generate a secret key of each entity, even though the divided identification information in both entities are the same the mask patterns thereof are different and, therefore, it becomes resistant to a collusion attack and the collusion threshold value can be made higher.

In addition, since a secret key of each entity is generated by combining the above described individual random number addition and the mask processing, a cryptoscheme which doesn't accept a random number substitution attack at all can be provided. In addition, in the present invention the components from each center at the time of generating a common key are synthesized through XOR so that the problem of carrying up can be solved.

As this invention may be embodied in several forms without departing from the spirit of essential characteristics thereof, the present embodiment is therefore illustrative and not restrictive, since the scope of the invention is defined by the appended claims rather than by the description preceding them, and all chances that fall within metes and bounds of the claims, or equivalence of such metes and bounds thereof are therefore intended to be embraced by the claims.

What is claimed is:

1. A secret key generating method generating a secret key of an entity in each of a plurality of key generating agencies, comprising the steps of:
    obtaining each divided identification information by dividing identification information of the entity into a plurality of blocks;
    extracting a part of the components of a symmetric matrix of a secret for each key generating agency in accordance with each divided identification information; and
    generating a secret key of the entity by synthesizing the extracted components with a random number particular to the entity;
    wherein the random number which is to be synthesized in a first key generating agency is generated based on a hash function generated in the first key generating agency and a hash function generated in one or plural key generating agency except the first key generating agency.

2. The secret key generating method according to claim 1, wherein J key generating agencies exist, the j-th G=1, 2, . . . , J) key generating agency sends the hash function, which the agency itself has generated, to the (j+1)-th, (first in the case of j=J), key generating agency and, in the (j+I)-th, (first in the case of j=J), key generating agency the random number which is to be synthesized in the agency itself is generated based on the hash function which the agency itself has generated and on the hash function of the j-th key generating agency which has been sent.

3. A secret key generating method for generating a secret key of an entity in each of a plurality of key generating agencies, comprising the steps of:
    obtaining each divided identification information by dividing identification information of the entity into a plurality of blocks;
    extracting a part of the components of a symmetric matrix of a secret for each key generating agency in accordance with each divided identification information;
    generating a mask pattern particular to each key generating agency in accordance with each divided identification information; and
    generating a secret key of the entity by masking the extracted components with the mask pattern.

4. A secret key generating method for generating a secret key of an entity in each of a plurality of key generating agencies, comprising the steps of:
    obtaining each divided identification information by dividing identification information of the entity into a plurality of blocks;
    extracting a part of the components of a symmetric matrix of a secret for each key generating agency in accordance with each divided identification information;
    generating a mask pattern particular to each key generating agency in accordance with each divided identification information; and
    generating a secret key of the entity by masking the extracted components with the mask pattern and by synthesizing the mask result with a random number particular to the entity.

5. The secret key generating method according to claim 4, wherein the random number which is to be synthesized in a first key generating agency is generated based on a hash function generated in the first key generating agency and a hash function generated in a second key generating agency.

6. The secret key generating method according to claim 5, wherein J key generating agencies exist, the j-th (j=1, 2, . . . , J) key generating agency sends the hash function, which the agency itself has generated, to the (j+1)-th, (first in the case of j=J), key generating agency and, in the (j+1)-th, (first in the case of j=J), key generating agency the random number which is to be synthesized in the agency itself is generated based on the hash function which the agency itself has generated and on the hash function of the j-th key generating agency which has been sent.

7. An encryption method for encrypting a plaintext to be transmitted from one entity to other entity, comprising the steps of:
    extracting a part of the components of a symmetric matrix of a secret for each key generating agency in accordance with each divided identification information which has been obtained by dividing identification information of the one entity into a plurality of blocks;

generating a mask pattern particular to each key generating agency in accordance with each divided identification information;

generating a secret key of the one entity by masking the extracted components with the mask pattern;

generating a common key by using a component corresponding to the other entity which is included in the secret key of the one entity; and encrypting the plaintext into a ciphertext by using the generated common key.

8. An encryption method for encrypting a plaintext to be transmitted from one entity to other entity, comprising the steps of extracting a part of the components of a symmetric matrix of a secret for each key generating agency in accordance with each divided identification information which has been obtained by dividing identification information of the one entity into a plurality of blocks;

generating a mask pattern particular to each key generating agency in accordance with each divided identification information;

generating a secret key of the one entity by masking the extracted components with the mask pattern and by synthesizing the mask result with a random number particular to the one entity;

generating a common key by using a component corresponding to the other entity which is included in the secret key of the one entity; and encrypting the plaintext into a ciphertext by using the generated common key.

9. A common key generating method for generating a common key which is used for an encryption process from a plaintext to a ciphertext and a decryption process from a ciphertext to a plaintext in a cryptographic communication between entities, comprising the steps of:

extracting a part of components of a symmetric matrix of a secret for each key generating agency in accordance with each divided identification information obtained by dividing identification information of one entity into a plurality of blocks;

generating a mask pattern particular to each key generating agency in accordance with each divided identification information;

generating a secret key of the one entity by masking the extracted components with the mask pattern;

extracting components which are included in the secret key of the one entity and correspond to another entity of the communication partner; and generating a common key by synthesizing the extracted components through XOR.

10. A common key generating method for generating a common key which is used for an encryption process from a plaintext to a ciphertext and a decryption process from a ciphertext to a plaintext in a cryptographic communication between entities, comprising the steps of:

extracting a part of components of a symmetric matrix of a secret for each key generating agency in accordance with each divided identification information obtained by dividing identification information of one entity into a plurality of blocks;

generating a mask pattern particular to each key generating agency in accordance with each divided identification information;

generating a secret key of the one entity by masking the extracted components with the mask pattern and by synthesizing the mask result with a random number particular to the one entity;

extracting components which are included in the secret key of the one entity and correspond to another entity of the communication partner; and generating a common key by synthesizing the extracted components through XOR.

11. A cryptographic communication method for carrying out an information communication using a ciphertext between a first and second entities, comprising the steps of:

obtaining each divided identification information by dividing identification information of the first and second entities into a plurality of blocks, respectively;

extracting a part of the components of a symmetric matrix of a secret for each key generating agency in accordance with each divided identification information, respectively;

generating a mask pattern particular to each key generating agency, respectively, in accordance with each divided identification information, respectively;

generating a secret key for the first and second entities, respectively, by masking the extracted components with the mask pattern, respectively;

generating a first common key by using components which are included in the secret key of the first entity and correspond to the second entity;

encrypting a plaintext into a ciphertext by using the generated first common key;

generating a second common key which is identical to the first common key by using components which are included in the secret key of the second entity and correspond to the first entity; and decrypting the ciphertext into a plaintext by using the generated second common key.

12. The cryptographic communication method according to claim 11, wherein components which are included in respective secret keys of the first and second entities and which correspond to the second and first entities are extracted, respectively, so that the extracted components are synthesized through XOR so as to generate, respectively, the first and second common keys.

13. A cryptographic communication method for carrying out an information communication using a ciphertext between a first and second entities, comprising the steps of:

obtaining each divided identification information by dividing identification information of the first and second entities into a plurality of blocks, respectively;

extracting a part of the components of a symmetric matrix of a secret for each key generating agency in accordance with each divided identification information, respectively;

generating a mask pattern particular to each key generating agency, respectively, in accordance with each divided identification information, respectively;

generating a secret key for the first and second entities, respectively, by masking the extracted components with the mask pattern, respectively, and by synthesizing the mask result with a random number particular to the first and second entities, respectively;

generating a first common key by using components which are included in the secret key of the first entity and correspond to the second entity;

encrypting a plaintext into a ciphertext by using the generated first common key;

generating a second common key which is identical to the first common key by using components which are included in the secret key of the second entity and correspond to the first entity; and decrypting the ciphertext into a plaintext by using the generated second common key.

14. The cryptographic communication method according to claim 13, wherein components which are included in respective secret keys of the first and second entities and which correspond to the second and first entities are extracted, respectively, so that the extracted components are synthesized through XOR so as to generate, respectively, the first and second common keys.

15. A cryptographic communication system for mutually carrying out, among a plurality of entities, an encryption process for encrypting into a ciphertext a plaintext which is information to transmitted and a decryption process for decrypting the transmitted ciphertext into a plaintext, comprising:

a plurality of key generating agencies, each of which extracts a part of the components of a symmetric matrix of its own secret in accordance with each divided identification information obtained by dividing identification information of each entity into a plurality of blocks, generates a mask pattern particular to its own in accordance with each divided identification information and generates a secret key of each entity by masking the extracted components with the mask pattern; and a plurality of entities, each of which generates a common key which is used for the encryption process and decryption process by using components corresponding to the entity of the communication object which are included in its own secret keys sent from the key generating agencies.

16. A cryptographic communication system for mutually carrying out, among a plurality of entities, an encryption process for encrypting into a ciphertext a plaintext which is information to be transmitted and a decryption process for decrypting the transmitted ciphertext into a plaintext, comprising:

a plurality of key gene-rating agencies, each of which extracts a part of the components of a symmetric matrix of its own secret in accordance with each divided identification information obtained by dividing identification information of each entity into a plurality of blocks, generates a mask pattern particular to its own in accordance with each divided identification information and generates a secret key of each entity by masking the extracted components with the mask pattern and by synthesizing the mask result with a random number particular to each entity; and a plurality of entities, each of which generates a common key which is used for the encryption process and decryption process by using components corresponding to the entity of the communication object which are included in its own secret keys sent from the key generating agencies.

17. A computer memory product having computer readable program code means for causing a computer to generate a secret key of an entity, by using each divided identification information obtained by dividing identification information of the entity into a plurality of blocks, and by using a secret symmetric matrix, said computer readable program code means comprising:

program code means for causing the computer to extract a part of the components of the symmetric matrix in accordance with each divided identification information;

program code means for causing the computer to generate a mask pattern in accordance with each divided identification information; and program code means for causing the computer to generate a secret key of the entity by masking the extracted components with the mask pattern.

18. A computer data signal embodied in a carrier wave for transmitting a program, the program being configured to cause a computer to generate a secret key of an entity, by using each divided identification information obtained by dividing identification information of the entity into a plurality of blocks, and by using a secret symmetric matrix, comprising:

a code segment for causing the computer to extract a part of the components of the symmetric matrix in accordance with each divided identification information;

a code segment for causing the computer to generate a mask pattern in accordance with each divided identification information; and a code segment for causing the computer to generate a secret key of the entity by masking the extracted components with the mask pattern.

* * * * *